United States Patent [19]

Clauzure

[11] Patent Number: 4,985,264

[45] Date of Patent: Jan. 15, 1991

[54] PROCESS FOR THE PREPARATION OF AN AQUEOUS SOLUTION OF ORGANOLEPTIC CONSTITUENTS AND ITS APPLICATION TO OBTAINING COLORLESS POTABLE SPIRITS OF THE WHISKEY TYPE

[75] Inventor: Andé C. Clauzure, Chemin des Cotes, France

[73] Assignee: Pernod Ricard, Paris, France

[21] Appl. No.: 382,984

[22] Filed: Jul. 20, 1989

[30] Foreign Application Priority Data

Jul. 25, 1988 [FR] France ................... 88 10001

[51] Int. Cl.$^5$ ................................................ C12G 3/00
[52] U.S. Cl. ................................ 426/330.4; 426/592
[58] Field of Search .................. 426/330.4, 423, 493, 426/494, 592, 533, 534, 650, 253, 257

[56] References Cited

U.S. PATENT DOCUMENTS

| 235,521 | 12/1880 | Fox | 426/494 |
|---|---|---|---|
| 2,007,727 | 7/1935 | Putt | 426/533 |
| 2,055,060 | 9/1936 | Barker | 426/592 |
| 2,132,435 | 10/1938 | Reiman | 426/592 |
| 2,271,797 | 2/1942 | Goss | 426/592 |
| 2,367,557 | 1/1945 | Atwood | 426/423 |
| 2,807,547 | 9/1957 | Nickol | 426/592 |
| 2,946,687 | 7/1960 | Jacobs | 426/592 |
| 4,073,955 | 2/1978 | Koppelman | 426/493 |

FOREIGN PATENT DOCUMENTS 863634  9/1981  U.S.S.R. ............................ 426/592

Primary Examiner—Carolyn Paden
Attorney, Agent, or Firm—Ladas & Parry

[57] ABSTRACT

The present invention relates to a process for the preparation of a colorless aqueous solution of the organoleptic constituents of a potable spirit which has been aged in wood, wherein:

(a) the potable spirit which has been aged in wood is decolorized by putting it into contact with an activated charcoal, either by addition of the activated charcoal to the bulk of the potable spirit to be decolorized, or by percolation of the potable spirit through activated charcoal placed in a column, (b) after decolorization, the activated charcoal is separated from the colorless potable spirit, (c) water is distilled over the activated charcoal recovered in (b), and (d) the distillate from stage (c), which is a colorless aqueous solution of organoleptic constituents from the starting potable spirit, is recovered.

The aqueous solution can be used for the preparation of colorless whiskey.

9 Claims, No Drawings

PROCESS FOR THE PREPARATION OF AN AQUEOUS SOLUTION OF ORGANOLEPTIC CONSTITUENTS AND ITS APPLICATION TO OBTAINING COLORLESS POTABLE SPIRITS OF THE WHISKEY TYPE

FIELD OF THE INVENTION

The present invention relates to the preparation of colorless potable spirits aged in wood.

The method of producing certain potable spirits requires aging of these alcohols in wood, an aging which is therefore accompanied by their becoming colored.

Because consumption habits are evolving, consumers today welcome alcohols, such as whiskies or brandies, which are colorless.

In particular, a colorless "pure malt Scotch whiskey aged at least 5 years" would be very much appreciated among leaders of opinion. This type of colorless product would also permit cocktails to be made with a potable spirit, particularly whiskey, base, the colors of which would not be altered by the amber color of the product on which they are based.

The solution to this problem could be found in the distillation of the colored potable spirit. Although the result of the distillation is acceptable, it has faults, in particular in the case of whiskies; this distillation removes their "age count" in the eyes of the authorities of the SWA (Scotch Whisky Association).

In order to obtain colorless products, in particular colorless whiskies, the decolorization of whiskey using activated charcoal has been proposed, but the products thus for obtained have organoleptic qualities which are somewhat removed from those of the original product. The process of the instant invention allows the "age count" of Scotch whiskies to be kept.

SUMMARY OF THE INVENTION

The present invention proposes a process which allows colorless potable spirits to be obtained which still have the "age count" and have the principal organoleptic characteristics of the original product; in particular the present invention relates to a process for the preparation of a colorless aqueous solution of the organoleptic constituents of a potable spirit which has been aged in wood, wherein:

(a) the potable spirit which has been aged in wood is decolorized by putting it into contact with an activated charcoal, either by addition of the activated charcoal to the mass of the potable spirit to be decolorized, or by percolation of the potable spirit through activated charcoal placed in a column, (b) after decolorization, the activated charcoal is separated from the colorless potable spirit, (c) water is distilled over the activated charcoal recovered in (b), and (d) the distillate from stage (c), which is a colorless aqueous solution of organoleptic constituents from the starting potable spirit, is recovered.

This process is applicable more particularly to Scotch whiskies and other grain alcohols which have been aged in wood, for example bourbon, but also to armagnac, cognac and rum; it is nevertheless convenient to choose potable spirits which do not have too pronounced a color.

The colorless aqueous distillate from stage (d) can be used as a flavored distilled water to reduce the alcoholic strength of the potable spirit obtained in stage (b) in order to obtain a colorless potable spirit which has kept its "age count". In fact, the SWA authorizes the use of distilled water for reducing the alcoholic strength of Scotch whiskies while retaining the "age count".

The invention also relates to the colorless potable spirits which have been aged in wood, thus obtained, as well as the aqueous solutions of organoleptic constituents which can optionally be used for flavoring other food products.

DESCRIPTION OF THE PREFERRED EMBODIMENTS

Decolorization of whiskey or of colored potable spirits is preferably carried out on the selected alcohol at full alcoholic strength, by adding activated charcoal to it; the quantity of the latter is determined experimentally, it is of the order of 1 to 5 g/l. When the charcoal is introduced into the bulk, the mixture, after homogenization, is left to rest for a period varying from 2 days to 1 week, at the end of which the decolorized alcohol is collected by filtration and the activated charcoal is retained. Filtration can be carried out on cellulose sheets. When decolorization is obtained by percolation through activated charcoal, the flow rate and the number of passages will be fixed during preliminary trials.

This activated charcoal is then used for the preparation of the colorless solution of organoleptic constituents. It is introduced into a still with water, and a fractional distillation is carried out. The useful fractions are identified by tasting, pooled and retained.

By using this colorless solution of organoleptic constituents for the reduction of the alcoholic strength of the potable spirit which has been decolorized according to this process, the latter is restored to its initial flavor.

The example below will allow other characteristics and advantages of the present invention to be demonstrated.

EXAMPLE 30 liters of 5-year-old Aberlour pure malt whiskey at a strength of 66.5% alcohol are treated with 60 g of "Clarocarbon G" (Merck) activated charcoal.

The mixture, after homogenization, is left to rest for 4 days, again homogenized then left to rest for an additional 3 days. Filtration is then carried out on cellulose sheets in order to collect the decolorized whiskey.

The activated charcoal thus recovered is placed in a still with 4 liters of water and distilled. 6 fractions are thus collected by fractional distillation:

No. 1: 250 cc,
No. 2: 250 cc,
No. 3: 250 cc,
No. 4: 500 cc,
No. 5: 250 cc,
No. 6: 500 cc.

The amount of organoleptic constituents in each fraction having been estimated by tasting, only fractions 1, 2 and 3 are chosen and pooled, thus constituting the colorless solution of the organoleptic constituents of the whiskey.

This solution was then used to reduce the alcoholic strength of the decolorized whiskey from 66.5% to 40% by volume in the following proportions:

0.601 l of whiskey at 66.5% vol.,
0.015 l of solution of organoleptic constituents,
qs 1 l of calcium-free water.

In a blind tasting carried out by well-informed consumers ("barmen" of Great Parisian Establishments) the product according to the invention was significantly preferred to the charcoal-treated product which had not received the flavored distilled water.

The process thus described has the advantage of giving products with a flavor close to that of the starting product, and which remains supple in the mouth.

What is claimed is:

1. A process for the preparation of a colorless aqueous solution of the organoleptic constituents of a starting potable spirit which has been aged in wood, comprising the following steps:
   (a) decolorizing the potable spirit by putting it into contact with an activated charcoal, either by adding the activated charcoal to the potable spirit to be decolorized, or by percolating the potable spirit though activated charcoal placed in a column,
   (b) separating the activated charcoal from the potable spirit so decolorized,
   (c) distilling water over the activated charcoal separated from the decolorized potable spirit thereby to form a distillate which is a colorless aqueous solution of organoleptic constituents from the starting potable spirit, and
   (d) recovering the distillate formed in step c.

2. The process as claimed in claim 1, wherein from 1 to 5 g of the activated charcoal is used per liter of potable spirit in step (a).

3. The process as claimed in claim 2, wherein the activated charcoal is separated from the potable spirit by filtration on a cellulose substance.

4. The process as claimed in claim 1, wherein the potable spirit to be decolorized is percolated through a column of activated charcoal.

5. A colorless aqueous solution of organoleptic constituents of a potable spirit which has been aged in wood, obtained by implementation of the process as claimed in claim 1.

6. The solution as claimed in claim 5, wherein the potable spirit which has been aged in wood is selected from the group consisting of cognacs, armagnacs, rums, and whiskies.

7. A process for the preparatoin of a colorless potable spirit which has been aged in wood comprising preparing a decolorized potable spirit and a colorless aqueous distillate according to the process of claim 1 and further comprising mixing the decolorized potable spirit with the distillate to reduce the alcoholic strength of the decolorized potable spirit in a desired amount.

8. The process as claimed in claim 7, wherein the starting potable spirit is a pure malt Scotch whiskey which has been aged for at least 5 years.

9. A colorless potable spirit prepared by the process as claimed in claim 7, said colorless potable spirit having organoleptic constituents substantially equivalent to the organoleptic constituents present in the starting potable spirit which has been aged in wood.

* * * * *